United States Patent Office 3,097,990
Patented July 16, 1963

3,097,990
POLYTETRAFLUOROETHYLENE SATURATED CROCIDOLITE FIBER PRODUCT
Richard B. Holly, Lancaster, Pa., assignor to Armstrong Cork Company, Lancaster, Pa., a corporation of Pennsylvania
No Drawing. Filed Jan. 16, 1961, Ser. No. 82,674
5 Claims. (Cl. 162—135)

This invention relates to sheet materials having a high degree of resistance to heat and chemicals, and more particularly to sheets of heat-, acid-, and alkali-resistant material suitable for use in gaskets and the like. This invention also relates to a process for preparing such products in which a fibrous sheet having a synthetic rubber binder is impregnated with a tetrafluoroethylene polymer.

A simplified flow diagram of the process is as follows:

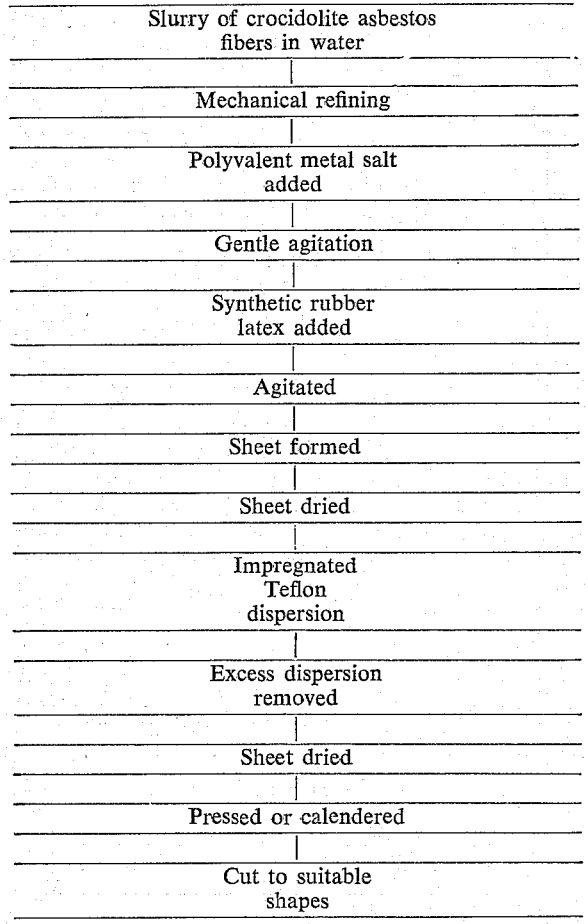

The heat-, corrosion-, and solvent-resisting properties of polytetrafluoroethylene have long been recognized, and attempts have been made to use dispersions thereof to impregnate fibrous materials, particularly asbestos materials, therewith to render them usable where these properties were desired. However, in these prior attempts difficulty has been experienced in obtaining uniform deposition of the polytetrafluoroethylene throughout a chrysotile asbestos sheet. The polytetrafluoroethylene particles would tend to filter out or coagulate as they penetrated the sheet, possibly because of the positively charged chrysotile fibers, causing a layer of polytetrafluoroethylene to coat both sides of the sheet and allow practically none to enter the center of the sheet.

It has now been found, by using the process and materials of this invention, that asbestos fiber structures may be readily saturated with a polytetrafluoroethylene dispersion, resulting in a product which is more resistant to acids, alkali, heat, corrosion, etc., than those previously made, and which is simpler and more economical to make. This product is especially suited for use over a wide range of sealing pressures due to the flexibility of the fibrous and nonfibrous components therein.

It is therefore the primary object of the present invention to provide a process which will permit the formation of a heat- and chemically-resistant sheet formed of crocidolite asbestos fibers having these desired qualities.

To this end, the invention contemplates forming a water slurry of crocidolite fibers and depositing thereon a synthetic rubber to provide wet strength in the formed sheet. The rubber coated fibers are subsequently formed into a sheet and dried. The sheet is then further treated by saturating with a polytetrafluoroethylene dispersion to uniformly deposit the polytetrafluoroethylene on the fibers thereof, after which the sheet is dried.

The first step in the process of the present invention contemplates forming a slurry of crocidolite asbestos fibers in water. This can be done in a known manner, by adding the fibers to sufficient water in a chest, pulper, or other convenient container in an amount such that the resulting slurry contains about 1%–6% by weight of fibers.

The slurry will next be subjected to mechanical refining as in a beater, Jordan engine, disc refiner, or the like to produce a slurry wherein the fibers are reduced to the desired degree of length and diameter. Refining will generally be equivalent to that produced in about 5 minutes in a Valley laboratory beater at 1.5% consistency with standard weights.

The slurry is then ready for any treatment necessary to satisfactorily deposit the rubber on the asbestos fibers. The first step is the addition of a polyvalent metal ion bearing an ionic charge of at least +3. This step is most conveniently accomplished simply by adding to the slurry a salt of a metal, which metal is in a valent state of +3 or greater. Aluminum ion bearing a charge of +3 is the preferred ion and is most conveniently added in the form of a water solution of papermaker's alum, $Al_2(SO_4)_3 18H_2O$. Although the polyvalent metal salt may be added directly to the slurry as such, it is preferred to add it in the form of a water solution. Such addition greatly enhances the distribution of the charged ions throughout the slurry and enhances the speed with which the total process may be completed.

The minimum amount of polyvalent metal ion needed to treat the crocidolite asbestos fibers in suspension is extraordinarily small. Usually about 0.1% by weight calculated as the metallic ion and based on the weight of the dry asbestos fibers is sufficient to render the particles amenable to subsequent deposition of a rubber binder. A good working rule is to add the salt of a polyvalent metal ion in an amount of about 2%–6% by weight based on the total dry weight of the asbestos being treated. This amount of the salt will always supply sufficient polyvalent metal ion to render the fibers amenable to subsequent treatment. Hence if 100 pounds of fibers are to be treated, at least 2 pounds of the salt will always suffice. A practical upper limit is 10% by weight of the salt based on the weight of the fibers. The larger amounts of the salt simply remain in the water, and if too large an amount of the salt is present, clumping and coagulation of the binder content of the latex will occur when the latex is added to the ion-treated slurry. Thus the practical limits are in the range of about 2%–10% by weight of the metal salt based on the dry weight of the fibers, with the preferred amount being 2%–6%. Within these ranges increasing amounts of metallic salt produce swifter deposition of the rubber.

Once the particles have been treated with the polyvalent metal ion, if necessary, preferably with gentle agitation, the slurry is ready for the addition of the synthetic rubber latex.

The latex to be added may be any of a number of synthetic rubbers used in the practice of conventional beater saturation methods. Typical of these synthetic rubbers are the products known as GR-S (SBR), which are copolymers of butadiene and styrene containing about 50% to about 70% by weight of butadiene. There may also be used the rubbers designated at Buna N, or Hycar (NBR); these are copolymers of butadiene and acrylonitrile containing about 50% to about 80% by weight butadiene. The neoprenes (CR) may also be used. The neoprenes are polymers of 2-chloro-butadiene-1,3, which polymers are also known as polychloroprenes. There may be employed the homopolymers of butadiene (BR) as well as homopolymers and/or copolymers of butadiene homologues such as the isoprene rubbers (IR). These are the materials which are generally designated as synthetic rubbers herein. They may be more specifically designated as rubber-like polymers of butadiene, isoprene, and chloroprene, and rubber-like copolymers of butadine or isoprene with copolymerizable vinyl compounds such as styrene and acrylonitrile. These synthetic rubbers are added to the slurry in the form of their latices. The latices normally contain about 25% to about 50% by weight of rubber solids. The latices contain additional compounding ingredients such as stabilizers and the like which are well-known to the art and which form no part of the present invention. The synthetic rubber latex is added as such to the ion-treated slurry of crocidolite asbestos fibers. The entire mass is agitated whereby it will be found that the rubber content of the synthetic rubber latex will deposit evenly and smoothly onto the ion-reacted crocidolite asbestos fibers. The resulting slurry of rubber-coated fibers is then formed into a product such as a sheet either on conventional papermaking equipment such as a Fourdrinier wire or cylinder machine, or in shaped molds which allow the draining of the water while retaining the rubber-coated fibers.

The amount of rubber to be deposited on the fibers may be selected in accordance with the requirements of the final product. Generally speaking, it is preferred that about 10% by weight of synthetic rubber based on the weight of the fibers be deposited on the fibers in order that the sheet formed from the treated fibers may be strong enough to withstand the handling and saturating that follows. The preferred range of rubber to be deposited on the fibers is in the range of 2%-15% by weight of the fibers. An amount larger than 15% would be undesirable, as the higher the rubber binder, the lower the percent polytetrafluoroethylene absorbed for a given immersion time. Therefore, it is preferred that the amount of rubber deposited on the asbestos fibers be maintained as low as is consistent with good handleability.

The treated fibers are then formed into a sheet by papermaking methods and dried before passing to the next step. Drying may be carried out at any temperature up to a point where the binder is destroyed. Drying temperatures in the neighborhood of about 100° C. are preferred. The sheet is next passed through a polytetrafluoroethylene dispersion containing 30.0% by weight of solids in an aqueous medium and containing as an emulsifying agent an alkyl aryl polyether alcohol. A suitable average particle size of the tetrafluoroethylene polymer is 0.2 microns. It is preferred that the time of immersion be about 3 minutes, in which time the sheet will pick up about 92% by weight of the polytetrafluoroethylene based on the weight of the dry sheet. This amount is sufficient to give the sheet outstanding properties of heat and chemical resistance. Lesser or greater amounts may be used depending on the qualities desired.

After the sheet has been immersed in the polytetrafluoroethylene dispersion for a sufficiently long time to pick up the required amount of polymer, the sheet is passed through squeeze rolls to remove excess dispersion and again dried. It may be calendered or pressed if desired. The dried sheet may then, if desired, be cut up into suitable shapes to serve as gaskets, etc.

The following examples illustrate several embodiments of the invention. All parts are by weight unless otherwise stated.

*Example 1*

Ingredients: Parts
  African blue asbestos (crocidolite)_____ 37.5
  Water _____ 3750
  10% water solution of alum_____ 10
  Butadiene-acrylonitride copolymer (Hycar 1561, 38.7% solids)_____ 9.69

The aqueous slurry of asbestos fibers was beaten for about 5 minutes to break up and disperse some of the largest asbestos "pencils." A 10% water solution of alum was added to render the fibers amenable to subsequent deposition of the rubber binder. The synthetic rubber latex was then added to the slurry and the entire mass agitated. In 1 minute precipitation time 10% rubber solids based on the weight of the fibers were evenly and smoothly deposited onto the ion-reacted crocidolite asbestos fibers. The precipitation time may be slowed down by adding a dispersing agent to the rubber.

The asbestos rubber sheet was formed in a hand sheet mold and dried. After drying, the sheet was carefully weighed.

The weighed sheet was then immersed for a total of 3 minutes at a room temperature of 70° F. in an aqueous dispersion of polytetrafluoroethylene containing the dispersing agent (Triton X–100), which is a nonionic surface-active agent that is chemically an alkyl aryl polyether alcohol. After being immersed for 1 minute, the sheet was then passed between squeeze rolls to squeeze out excess fluid. Following this the sheet was weighed wet, and by calculation about 53.2% polytetrafluoroethylene based on the weight of the sheet was picked up. An immersion time of 2 minutes resulted in a pick-up of 71% of the polymer, and a 3-minute immersion time resulted in a pick-up of 84.7%. The sheet was then dried at a temperature of 195° F. The dry sheet was weighed and the weight indicated an actual pick-up of 92% on the sheet weight.

Ring gaskets 2½" x 3¾" were cut from the sheet. One of the gaskets was pressed cold to 116 pounds per cubic foot; the other was pressed at 700° F. to the same density. Both sintered and nonsintered gaskets sealed LB-300X Ucon lubricant at 500 p.s.i. and 500° F.

*Example 2*

Ingredients: Parts
  African blue asbestos (crocidolite)_____ 18.75
  "Fiberfrax" aluminum silicate fibers_____ 18.75
  Water _____ 3750
  10% water solution of alum_____ 10
  Butadiene-acrylonitrile copolymer (Hycar 1561, 38.7% solids)_____ 9.69

The aqueous slurry of blue asbestos fibers was beaten the same as in Example 1. The "Fiberfrax" fiber was used "as received" and blended with the blue asbestos. The mixture was diluted and treated with alum followed by the addition of rubber. The total time for the precipitation of rubber in the amount of 10% based upon the weight of the fibers was 3 minutes.

As in Example 1 the rubber-bound sheet of fibers was dried and immersed in an aqueous dispersion of polytetrafluoroethylene. After 1 minute immersion it was found that the sheet picked up 104% of the polymer based on the weight of the fibers, and a 2-minute immersion resulted in a pick-up of 109% of the polymer. After drying and pressing, an adequate chemical-resistant gasket material resulted.

I claim:

1. A process for obtaining fibrous structures impregnated with tetrafluoroethylene polymer, which comprises forming a slurry of crocidolite asbestos fibers, treating the slurry with a water solution of alum, depositing a synthetic rubber binder on said fibers in the range of from 2–15% by weight of rubber based on the weight of the fibers, forming a sheet from said rubber-coated fibers, drying said sheet, and immersing said sheet in an aqueous colloidal dispersion of tetrafluoroethylene polymer for a period of time sufficient to uniformly disperse and deposit the saturant throughout the sheet, and drying the sheet.

2. A process according to claim 1 wherein said synthetic rubber is a butadiene-acrylonitrile copolymer.

3. A process according to claim 1 wherein said synthetic rubber is a butadiene-styrene copolymer.

4. A process according to claim 1 wherein said synthetic rubber is 2-chloro-butadiene-1,3.

5. An article comprising a water-laid fibrous sheet of crocidolite asbestos having a synthetic rubber binder in the range of from 2–15% by weight rubber based on the weight of the fibers, said sheet saturated with a polytetrafluoroethylene dipersion.

References Cited in the file of this patent

UNITED STATES PATENTS

| | | |
|---|---|---|
| 2,133,693 | Greider | Oct. 18, 1938 |
| 2,301,998 | Bernstein | Nov. 17, 1942 |
| 2,825,706 | Sanders | Mar. 4, 1958 |
| 2,930,106 | Wrotnowski | Mar. 29, 1960 |
| 2,937,156 | Berry | May 17, 1960 |
| 2,962,414 | Arledter | Nov. 29, 1960 |